United States Patent
Gopalasetty et al.

(10) Patent No.: US 9,125,089 B2
(45) Date of Patent: Sep. 1, 2015

(54) METHOD AND APPARATUS FOR PACKET AGGREGATION IN A NETWORK CONTROLLER

(71) Applicant: Aruba Networks, Inc., Sunnyvale, CA (US)

(72) Inventors: Bhanu S. Gopalasetty, San Ramon, CA (US); Ramsundar Janakiraman, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 29 days.

(21) Appl. No.: 13/931,612

(22) Filed: Jun. 28, 2013

(65) Prior Publication Data

US 2014/0269766 A1    Sep. 18, 2014

Related U.S. Application Data

(60) Provisional application No. 61/799,566, filed on Mar. 15, 2013.

(51) Int. Cl.
*H04J 3/24* (2006.01)
*H04L 12/26* (2006.01)
*H04L 12/28* (2006.01)
*H04W 28/06* (2009.01)

(52) U.S. Cl.
CPC .................. *H04W 28/065* (2013.01)

(58) Field of Classification Search
USPC ................... 370/473, 252, 392, 232
See application file for complete search history.

(56) References Cited

U.S. PATENT DOCUMENTS

| 6,134,217 | A  | * | 10/2000 | Stiliadis et al. ............... 370/232 |
|-----------|----|---|---------|----------------------------------------|
| 7,529,242 | B1 | * | 5/2009  | Lyle ............................. 370/392 |
| 2005/0135284 | A1 | | 6/2005  | Nanda et al. |
| 2006/0083168 | A1 | | 4/2006  | Prakash |
| 2007/0153745 | A1 | | 7/2007  | Sun et al. |
| 2011/0019557 | A1 | * | 1/2011  | Hassan et al. ............... 370/252 |
| 2011/0058473 | A1 | | 3/2011  | Krym et al. |
| 2013/0322456 | A1 | | 12/2013 | Ito et al. |
| 2014/0079016 | A1 | | 3/2014  | Dai et al. |
| 2014/0269752 | A1 | | 9/2014  | Bhanage et al. |

\* cited by examiner

*Primary Examiner* — Kiet G Tang

(57) ABSTRACT

The aggregation of packets in a network controller is described. A packet, destined to a station, is received at a network device having a plurality of processors. The packet is queued into a selected queue of a plurality of queues based at least on an identifier of the station and a category associated with the packet. The packet is aggregated with other packets in a selected queue to create an aggregated packet if the selected queue has reached a predetermined size, and the aggregated packet is transmitted to the destination station.

15 Claims, 7 Drawing Sheets

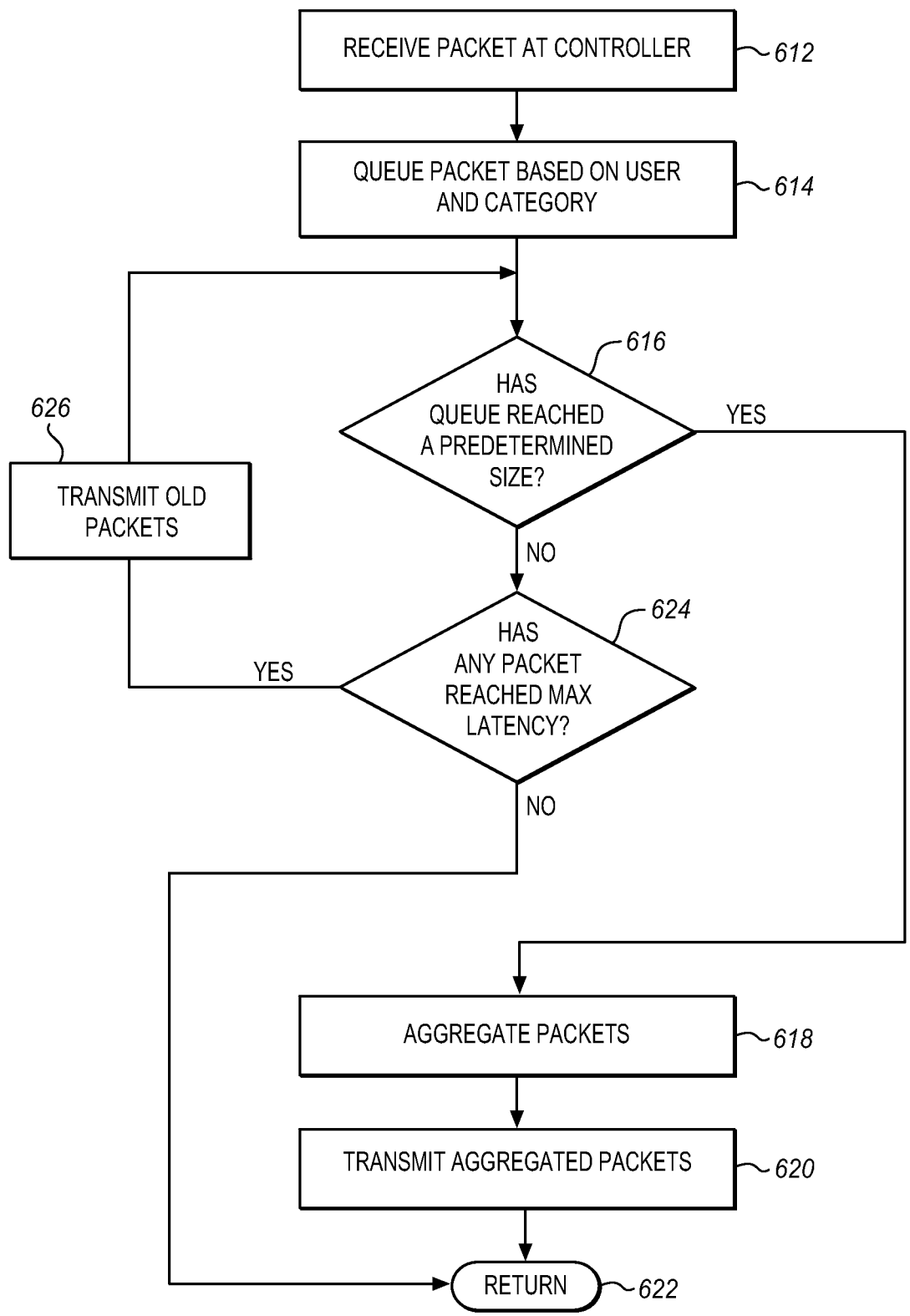

METHOD AND APPARATUS FOR PACKET AGGREGATION IN A NETWORK CONTROLLER

CROSS-REFERENCE TO RELATED APPLICATIONS

This application claims the benefit of U.S. Provisional Patent Application Ser. No. 61/799,566, filed on Mar. 15, 2013, the entire contents of which are incorporated by reference.

FIELD

Embodiments of the disclosure relate to the field of communications, and in particular, to a system, digital device and method that is directed to the aggregation of packets for sending through a network.

GENERAL BACKGROUND

Currently, the Wi-Fi Alliance is proposing that packets be aggregated into larger groups of packets before being sent in tunnel mode to a remote station (STA). For stations that support a VHT (Very High Throughput) mode, the number of aggregated packets may be very large. The aggregation is a key part of reaching a stated goal of 1 gigabit per second for wireless communications.

The selection of the number of packets to be aggregated greatly affects the transmission rate, the amount of overhead, and the airtime required to transmit the packet. In addition, to aggregate packets, the system must wait for all of the packets that are to be aggregated to arrive before they can be aggregated. In addition, the system must wait for enough packets to arrive to satisfy the conditions for aggregation. This introduces delays that impact applications or user experiences.

BRIEF DESCRIPTION OF THE DRAWINGS

The invention may best be understood by referring to the following description and accompanying drawings that are used to illustrate embodiments of the disclosure.

FIG. 6 is an exemplary embodiment of a general flowchart for aggregating packets using queues.

DETAILED DESCRIPTION

Figure 1:
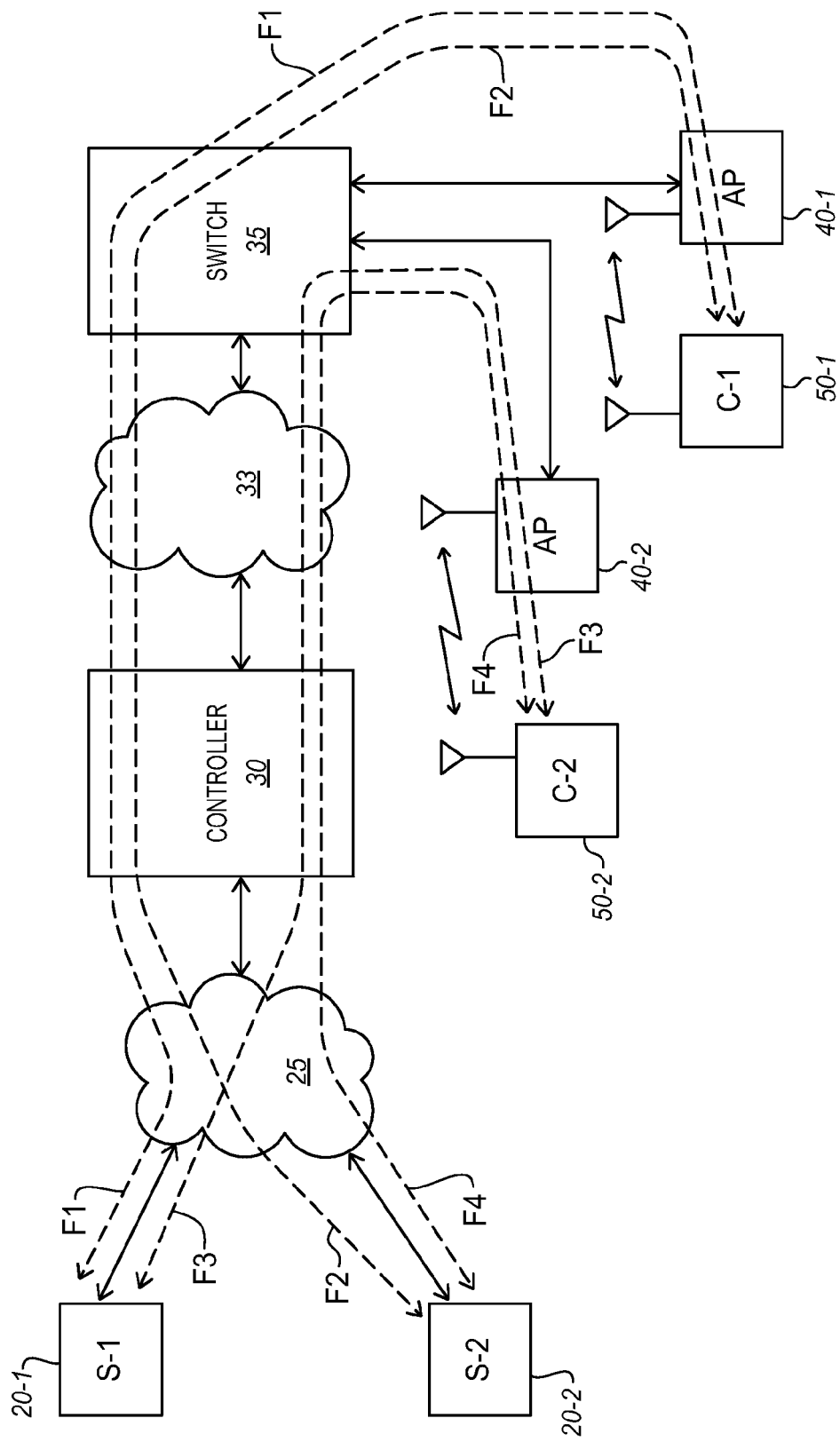
FIG. 1 is an exemplary embodiment of a network architecture in which clients exchange packets using tunnels through the cloud.

Embodiments of the disclosure relate to a system, a digital device and method for packet aggregation in a network controller. The objective of aggregation is to increase overall packet throughput. Described embodiments further allow aggregation to comply with demands and traffic for particular channels.

Embodiments are described in which packet forwarding logic at a controller handles one packet at a time. The handling has little or no dependency on packets before or after the current packet. In a tunnel mode, the A-MSDU (Aggregated Media access controller Data Service Unit) aggregation happens at the controller. The controller's data path adds a packet egress queuing layer to the normal forwarding logic so that meaningful packet aggregation is performed.

The controller maintains a queue for each STA (destination station) that is capable of A-MSDU and for each Access Category for that STA. The Access Category is based on the configuration on the SSID (Service Set Identification) profile.

In embodiments, in the forwarding path, a frame that is marked to be aggregated is queued until one of the following conditions are fulfilled: (i) there are enough frames in the queue that satisfy the A-MSDU size, or (ii) the frames' timer expires, although there isn't a per packet time, a time stamp can be used for each packet to ensure that packets are not overly delayed while waiting for the first condition to be met.

In embodiments, a particularly efficient logic and architecture for managing queues. There may be a large number of queues. If there are 4,000 A-MSDU capable clients and 2 access categories are enabled for each client, then there are 8,000 queues. Efficiently managing the possible large number of queues ensures that very little latency is introduced.

Herein, certain terminology is used to describe features for embodiments of the disclosure. For example, the term "digital device" generally refers to any hardware device that includes processing circuitry running at least one process adapted to manage the flow of control traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral such as Apple® TV, a printer, a mobile handset, a smartphone, a personal digital assistant "PDA", a wireless receiver and/or transmitter, an access point, a base station, a communication management device, a router, a switch, and/or a controller. Examples of digital devices also include a sensor, an appliance, a security device, such as a gate, door or window lock, or a physical plant controller such as for a water heater, steam generator, pumping system, or climate control system.

One type of digital device, referred to as a "controller," is a combination of hardware, software, and/or firmware that is configured to process and/or forward information between digital devices within a network.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") and "process" are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

The term "interconnect" is a communication path between two or more digital devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "message" is a grouping of data such as a packet, a frame, a stream (e.g., a sequence of packets or frames), an Asynchronous Transfer Mode (ATM) cell, or any other series of bits having a prescribed format. Herein, a message comprises a control payload and a data payload. The control payload is adapted to include control information such as source and destination MAC (Media Access Control) addresses, Internet Protocol (IP) addresses (e.g., IPv4 or IPv6 addressing), protocol, source and destination port information, and/or packet type.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. For instance, illustrative embodiments describe configuring a headless device. Such discussions are for illustrative purposes and do not preclude this invention from being conducted on other types of devices and using different encryption and key exchange systems. Also, well-known logic and operations may not be set forth in detail in order to avoid unnecessarily obscuring this description.

I. General Architecture

FIG. 1 shows a block diagram of the components of the network system in which an embodiment of the invention may be implemented. In FIG. 1, the network system 100 includes a plurality of trusted and/or un-trusted sources 20-1, 20-2 coupled through the cloud 25, to a controller 30. The controller is coupled through the cloud 33 to a switch 35. The switch 35 is coupled to a plurality of access points (AP) 40-1, 40-2. Each access point is coupled to one or more clients 50-1, 50-2. The network allows the clients to communicate through the cloud to a variety of different sources.

FIG. 1 shows four two-way communication flows. The first flow F1 is from a first source S-1 to a first client C-1. The second flow F2 is from a second source S-2 to the first client C-1. A third flow F3 is from the first source S-1 to a second client C-2 and a fourth flow F4 is from the second source S-2 to the second client C-2. These flows are provided as examples to illustrate various aspects of the invention. There may be many hundreds or thousands or source and many hundreds or thousands of clients so that there may be many more than four flows. The four flows shown by the arrows of FIG. 1 are for illustration purposes only. In each case the illustrated flows propagate through the controller, the switch, and an AP.

In one embodiment, the controller 30 includes a plurality of physical ports that are connected through the cloud 33 to the physical ports of an Ethernet switch 35. In one embodiment, the controller 30 is an IEEE 802.11 controller that includes two GE (Gigabit Ethernet) uplinks and downlinks. The Ethernet switch 35 may include GE physical ports that are respectively connected to 2 GE physical ports on each of a plurality of controllers through a variety of different connections. The network may be a wireless network operating according to 802.11 standards (Wi-Fi or Wireless Local Area Network, WLAN). The network 10 may also be a wired network (e.g., IEEE 802.11ac, IEEE 802.3, etc.) that is connected to the Ethernet switch 20. As shown, the network may include a combination of wired and wireless paths.

The cloud 25, 33 may be a local area, metropolitan area, or wide area network, an intranet or the Internet. The cloud may be trusted or untrusted.

As shown in FIG. 1, the switch 35 may be connected to each of a plurality of APs 40-1, 40-2 to provide support to the APs. Alternatively, the controller 30 may provide support to the APs. For instance, in some embodiments, the controller maintains configurations, automates updates for the APs, provides network protection (e.g., firewall, wireless intrusion protection, secure remote connections, etc.) as well as optimizes radio connections. In one embodiment, the APs are IEEE 802.11 APs that include two GE uplinks.

The connection between the APs 40-1, 40-2 and the client devices 50-1, 50-2 may be a wired connection or a wireless connection. As illustrated in FIG. 1, the client devices may be wireless devices or wired devices. For instance, the client devices may be consumer electronic devices such as a general-purpose computer, a laptop computer, a mobile telephone communications device having data capabilities (e.g., smartphones), a tablet computer, a personal digital media player. The client devices may be referred to as a STA for purposes of the present description.

Figure 2:
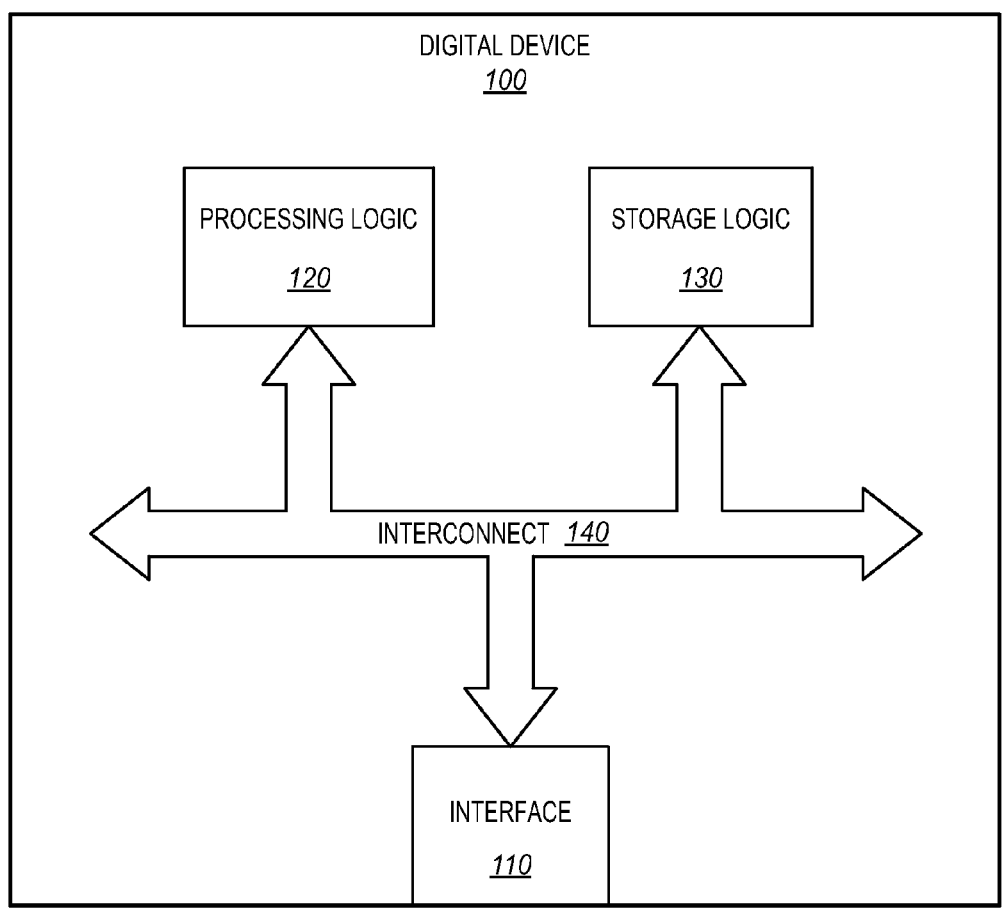
FIG. 2 is an exemplary embodiment of a network device that communicates on the network.

Referring to FIG. 2, an exemplary embodiment of a digital device 100 is shown. The digital device 100 may correspond to a controller 30, a switch 35, an AP 40, or a client device 50, as shown in FIG. 1. In accordance with one embodiment of the disclosure, the digital device 100 comprises an interface 110, processing logic 120 and storage logic 130, in which one or more of these logic units are coupled together via an interconnect 140.

Herein, the interface 110 enables the digital device 100 to communicate with other devices supporting wired and/or wireless connectivity. For instance, the interface 110 may be implemented as a wireless adapter (e.g., one or more radios, antenna(s) or the like) adapted to receive ingress messages and/or a wired adapter (e.g. connector) through which ingress messages are received over a wired interconnect.

The processing logic 120 is adapted with logic to classify ingress packets, and where appropriate, assign priority to these classified ingress packets. The classification scheme may be revised through the use of one or more access control lists (ALUs) that enable administrator controlled modification of content addressable memory (CAM), which is used for message classification. Also, processor load may be adjusted through recordation of message flow distribution among the processors and dynamic alternation at runtime of processor identifiers within a shared table used for load balancing.

As further shown in FIG. 2, storage logic 130 is volatile and/or non-volatile memory implemented within digital device 100 and utilized by processing logic 120. According to one embodiment of the disclosure, the storage logic 130 features content addressable memory (CAM) and/or random access memory (RAM) accessible by processing logic 120.

Figure 3:
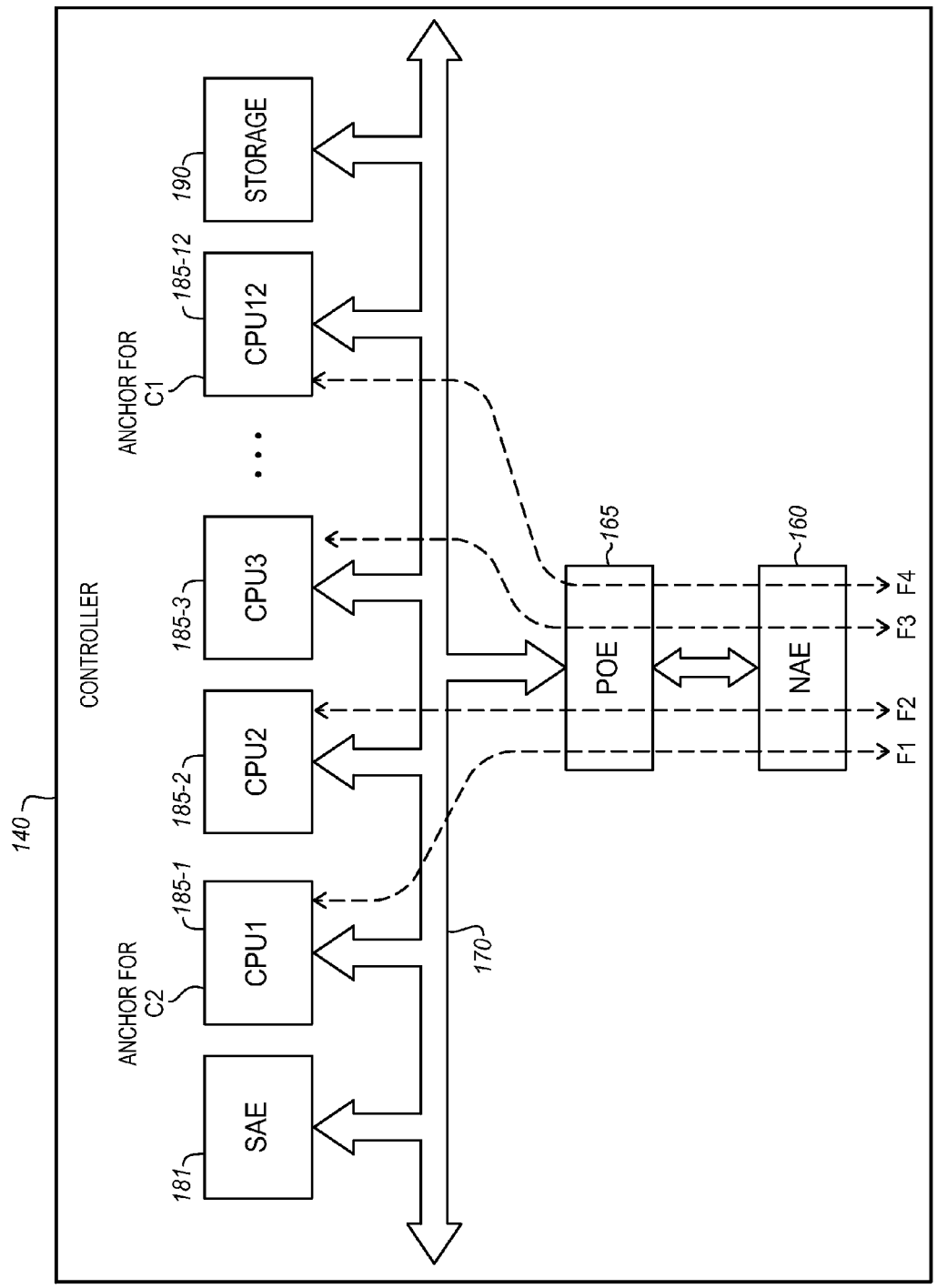
FIG. 3 is an exemplary embodiment of a network controller that communicates on the network.

Referring to FIG. 3, an exemplary embodiment of a controller 140 is shown. The controller 140 may correspond to a switch 20, a controller 30, or another device as shown in FIG. 1. In accordance with one embodiment of the disclosure, digital device 100 comprises an interface 160, such as an NAE (Network Acceleration Engine), ordering logic 165, such as a POE (Packet Ordering Engine), processing logic 181, 182, 183, and storage logic 190, in which one or more of these logic units are coupled together via an interconnect 170.

The interface 160 enables the digital device 140 to communicate with other devices supporting wired and/or wireless connectivity. For instance, the interface 160 may be implemented as a wireless adapter (e.g., one or more radios, antenna(s) or the like) adapted to receive ingress messages and/or a wired adapter (e.g. connector) through which ingress messages are received over a wired interconnect.

The processing logic includes multiple processors or processor cores. An optional SAE (Security Acceleration Engine) 181 optionally encrypts and decrypts packets and frames depending on the needs of the traffic. For tunnel traffic, the frames are typically encrypted before transmission and decrypted upon receipt. A plurality of packet processing CPUs 185-1, 185-2, 185-3, 185-4 . . . 185-12 (Central Processing Units) CPU1-CPU12 receive and process ingress packets, and provide any further packet processing. While 12 cores are shown, there may be more or fewer depending on the particular implementation. The cores may represent different cores of a single processing die, different processing dies, or a combination of multiple core processors. Additional cores may perform additional functions, that are not shown and described herein. Functions may be distributed among the cores in different ways than described herein.

The packet processing logic 185 analyzes ingress packets, interprets any commands or other information, performs any calculations and sends commands to any of the other logic. The processing logic also generates egress packets and provides, for example, (1) destination MAC address, (2) source MAC address, (3) IP (DEST IP) address, (4) source IP (SRC IP) address, (5) protocol, (6) destination port number (DEST PORT), and/or (7) source port number (SRC PORT) for any egress packets as appropriate. The processing logic operates using the received network configuration to receive and send packets to designated nodes on the network through the interface 160.

The packet processing cores also act as anchor CPUs for particular clients 50. As anchor CPUs, they monitor and track queues for packet aggregation and for latency and notify packet ordering logic 165 when packets are to be sent and removed from a respective queue.

As further shown in FIG. 3, storage logic 190 is volatile and/or non-volatile memory implemented within the controller and used by the packet processing logic 185 and other logic as necessary. The storage logic 190 is accessible to all of the components through the interconnect 170.

The four flows of FIG. 1 are also shown in FIG. 3. The first flow F1 which is between the first source and the first client is shown as flowing to the first packet processing core 185-1. The flow indicates that the first core CPU1 functions as the ingress packet processor for flow F1. In this example, the first processing core has also been designated as the anchor core for the first client C-1. The second packet flow path F2 is assigned to the second core CPU2, but CPU2 is not the anchor core for C2. Similarly, the third packet flow F3 assigned to CPU3 as the ingress processor, but not as the anchor core. The fourth flow F4 is assigned to CPU 12 which also acts as the anchor core for C2.

This mapping provides an example of how the POE is able to assign packet processing and anchor functions to different cores independently of each other. Typically, once a client is assigned to a processing core, the processing core will negotiate the communication details with that client and keep a record of client capabilities, policies, and preferences. This simplifies packet processing because the client details are readily available and no further negotiation is required.

Figure 4:
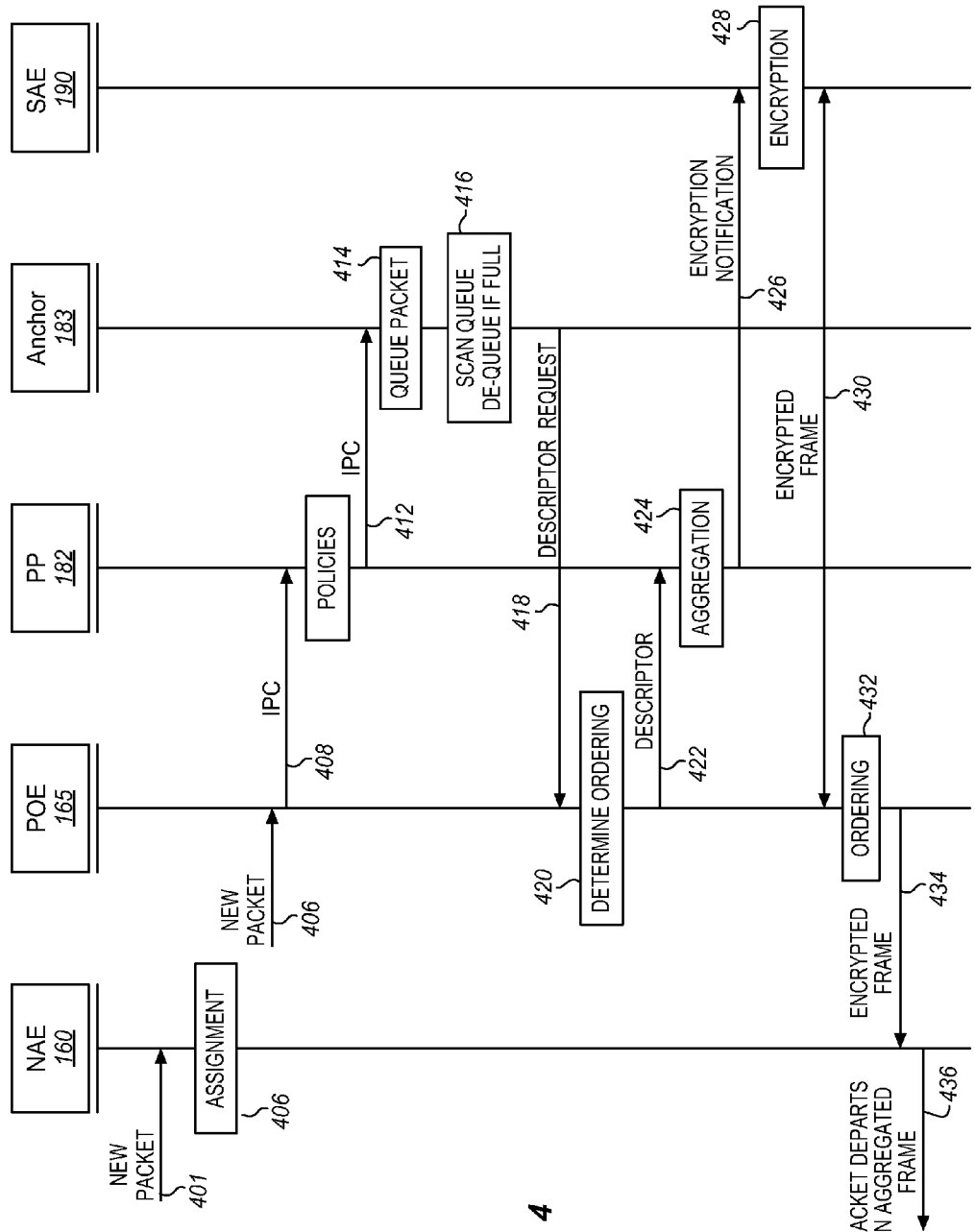
FIG. 4 is an exemplary embodiment of signaling between components of the controller of FIG. 3.

FIG. 4 is a diagram of how packets may be aggregated using the controller of FIG. 3. In FIG. 4, the interface 160, ordering logic 165, packet processing logic and anchor CPU 185 cooperate to use queues in storage logic 190 to efficiently aggregate packets with low delay. In the described embodiment, operations flow between the components as indicated by the arrows. While the packet processing logic 185 is shown as separate from anchor logic 183, these functions may be performed on the same or different processing cores as shown in FIG. 3. Since the functions are logically different, they are described as two different components.

At 401 a packet arrives at the controller. It is received at the interface 160, in this example, an NAE. At 404, the NAE hashes the packet and then uses the hash value to assign the packet to one of the packet processors. In the illustrated example, packet processor 12 receives the assignment. The NAE then sends the packet to ordering logic 165 at 406. The hash may be taken on all or only some portion of the headers of the packet.

The hash is used, in this example, to group packets that share similar characteristics. By hashing destination and routing headers, packets with the same or similar paths are grouped together. The hash may be a CRC (Cyclic Redundancy Check) or any other mathematical operation on the chosen fields. The hash may be applied to a table so that all packets with the same hash result are sent to the same packet processor. The assignment may alternatively be made in other ways.

At 408, the POE 165 sends at 408 an IPC (Inter-Processor Message) message to the assigned packet processor 185. In some implementations, an FMN (Fast Messaging Network of NetLogic Solutions, Inc.) message may be used, depending on the particular implementation. The assigned packet processor 185 acts as an ingress CPU, and applies polices at 410. When it is ready to send the packet out, the packet processor checks if the frame requires decryption or encryption and a sequence number. When the packet is ready the packet processor at 412 sends an IPC message for the packet to the counter or anchor CPU 183.

The anchor CPU operates aggregation queues based on a number of different criteria. If the destination station is VHT enabled and A-MSDU aggregation is enabled for that station, then the counter CPU queues the buffer for A-MSDU aggregation. If the destination is not both VHT and A-MDSU enabled then the packet is forwarded to the end station through the interface 160. This can be done for example, using an IPC message to request a POE descriptor from the POE. The POE will then cause the packet to be sent when its descriptor indicates that the packet's place in the sequence ordering has arrived.

For packets that are to be aggregated all of the frames destined to any particular user are sent to the anchor CPU 183. Accordingly, it serves as a User Anchor CPU with information about each user. It also serves as a counter CPU as described in more detail below. The anchor CPU queues the packet at 414.

The packet queues are shown in more detail below, however, the anchor CPU uses a per-User per-WMM (Wi-Fi Multimedia) queue for packet aggregation, in the described example, A-MSDU aggregation. In other words, there is effectively a queue for each client device and for each WMM class of each client. As mentioned above for 2,000 users and four classes, there may be 8,000 effective queues. In addition, each packet may be time-stamped before it is placed in its respective queue.

At 416, the anchor CPU checks each queue to see if it has reached a trigger point for aggregation. In one example, the trigger is reached if the packets in the queue have a total size that exceeds a minimum aggregated packet size. This size may be 3 Kb, 8 Kb, or more. The particular minimum size of an aggregated packet depends on the particular network configuration and the capabilities of devices on the network. The anchor CPU may maintain different minimum sizes for different users Once the frames listed in the queue qualify for aggregation, the anchor CPU requests a POE Descriptor at 418. The descriptor is to reserve a spot with the POE for transmission. The aggregated packet may then have a reserved transmission location in the ordering pipeline. The request may use the identification of the packet of the head of the list of packets in the queue that will be aggregated. This packet is the oldest packet in the queue and therefore serves as a good starting point for aggregation. With the head packet identified and the aggregation notification having been sent out, the anchor CPU can remove the packets that will be aggregated from their respective queue.

At 420, the POE determines the ordering of the aggregated packet and replies at 422 with a confirmation to the ingress CPU 185. The ingress CPU, receives the head packet of the packet list in the queue in the Description. It then walks the list of packets back until it has reached the minimum size, e.g. 8 Kb. The ingress CPU then aggregates the packets at 424 to generate an aggregated frame.

At 426, the ingress CPU, notifies the SAE 181 to encrypt the aggregated frame and prepare destination buffers. The SAE encrypts the frame at 428 and queues the encrypted frame at 430 to the POE. At 432, the POE orders all outgoing packets and frames and when the ordering arrives at 434 it forwards the aggregated encrypted frame to the NAE. At 436, the aggregated, encrypted frame egresses out. The packets have already been dequeued as the anchor CPU manages the queues.

While the message flow of FIG. 4 shows how packets may be queued to create an aggregated frame, in some cases it may take too long to accumulate enough packets. As mentioned above, each packet may be associated with a time stamp. The anchor CPU can be used to check the time stamps and if a packet has been waiting too long then it may be sent without aggregation. Alternatively, the packet may be aggregated with any that are available and forwarded as a smaller aggregated frame. The process of scanning the queues for old packets may be simplified by ordering the queues based on the time that a packet was received.

Figure 5A:
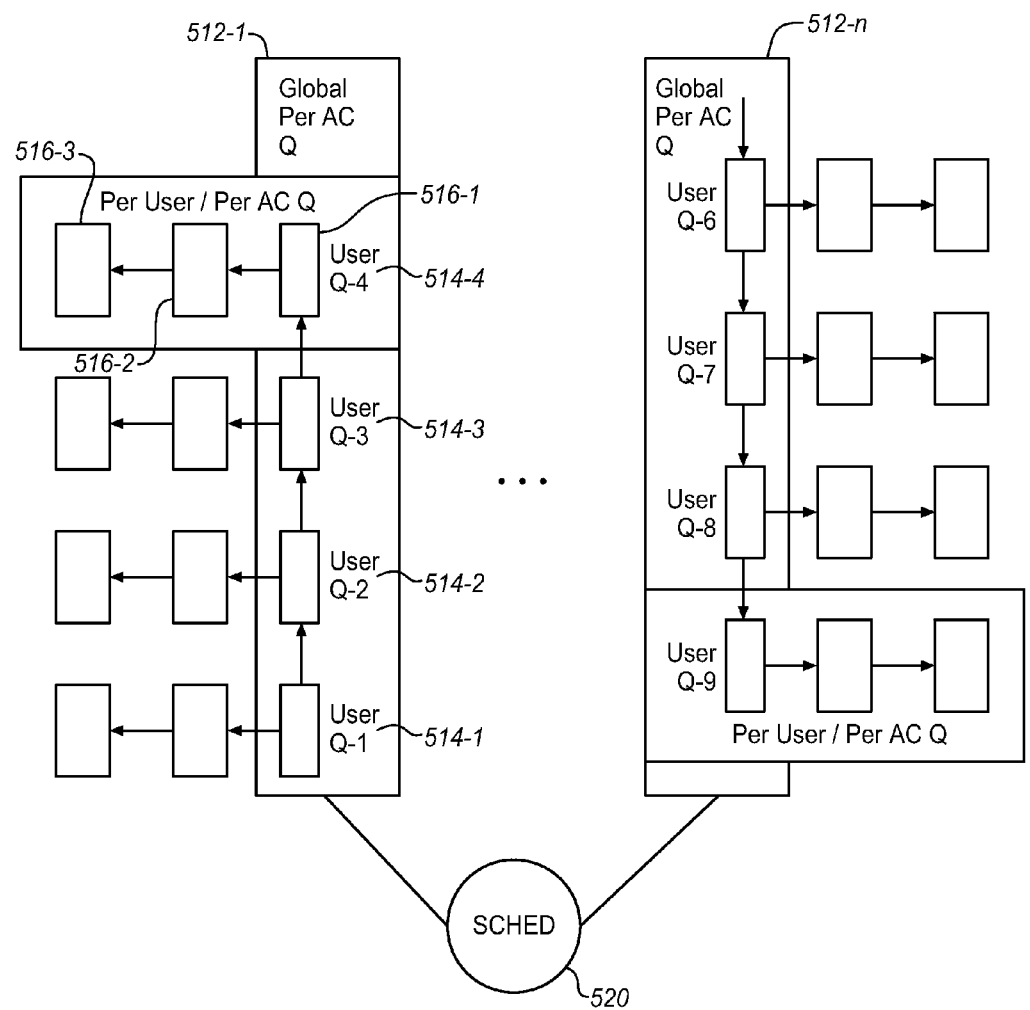
FIG. 5A is an exemplary embodiment of queues for aggregating traffic.

FIG. 5A is a diagram of an example of a packet queue system with multiple packet queues. In the illustrated example, there are n queues 512-1 to 512-n, one for each of n different access classifications. WMM (Wi-Fi Multimedia), also referred to as WME (Wireless Media Extensions), identifies four traffic classes or Access Categories for prioritizing packets. The classes are for use in QoS (Quality of Service and other features. For the traffic classes n=4. The four classes, identified from lowest priority to highest priority are: 0, BE, Best Effort; 1, BK, Background; 2, VI, Video; 3, VO, Voice.

In e.g. IEEE 802.11, each packet has a field in its header for TID (Traffic Identification) and is a user priority. The TID is generally used for QoS (Quality of Service) and packet prioritization and scheduling. As currently defined, TID may take any one of eight different values from 0-7 and these may be mapped to the four Access Categories as BE (0,3), BK (1,2), VI (4, 5), VO (6,7), however, any of a variety of other mappings may be used. The TID, the Access Categories or any of a variety of other priority or type information may be used to provide class information for the queue of each user. In addition, several priorities, traffic types, or classes may be combined to derive an overall classification of each type of packet.

For each of the four or more queues 512-1 to 512-n, there is a sub queue 514-1 to 514-4 for each user. Each sub queue has a sequence of packets 516-1 to 516-3. While only eight different user sub queues are shown, there may be many hundreds or thousands of users and while only three packets are shown there may be many or hundreds of packets. Each packet in each sub queue has a time stamp and is in time order with the oldest packet at the front or end of the queue. It may be noted that according to current proposals multicast and broadcast traffic is not subjected to A-MSDU and so these packets will not be queued by the anchor CPU with the other types of packets.

As shown, each queue 512 is based on a particular WMM (A-MSDU), however a different classification system may be used, depending on the particular implementation. Irrespective of any particular user or client, the packets be belonging to a given WMM are queued in each of the main queues.

In addition to the e.g. four main queues, a list of packets is maintained on a per-user basis for each queue. This list functions like a queue within a queue.

A scheduler 520 of the packet processor or ingress CPU 185 services the queues and determines when a packet has timed out or a user has accumulated enough packets. The queues may be serviced between packets in msg_recv interval.

Using the time stamps, the scheduler may operate on a strict priority simply by scanning the four queues to determine the oldest packet. This can be done very quickly because only four packets are inspected. The four different classifications may have different demands for latency, however, because packets are sorted by classification, these differences can be accommodated easily and quickly. Voice, for example, may allow for only a few microseconds of latency. If the oldest packet is more than a few milliseconds old, then it can be sent whether or not there are enough packets for aggregation. Background data, on the other hand may permit up to a second of latency. A different timing rule may then be applied when scanning the timestamp of the oldest packet in the background queue as compared to the voice queue. The particular allowable latency for each packet may be adapted to suit any particular implementation.

As described above, the scheduler checks the timestamp of the packet at the head of each queue. If the timestamp is older than the allowed time difference, then any pending frames are aggregated. This process can cycle through each queue to ensure that no packets are delayed too long in order to be aggregated with other packets that come later.

In a parallel process the size of the queue is also checked. Since there is a list for each user and each classification, the packet processor 185 can check each user's queue in each category and if there are enough packets, for aggregation, then the packets in that category are aggregated for that user. If new packets are arriving quickly enough, then packets may be aggregated long before the oldest time stamp becomes too old.

Figure 5B:
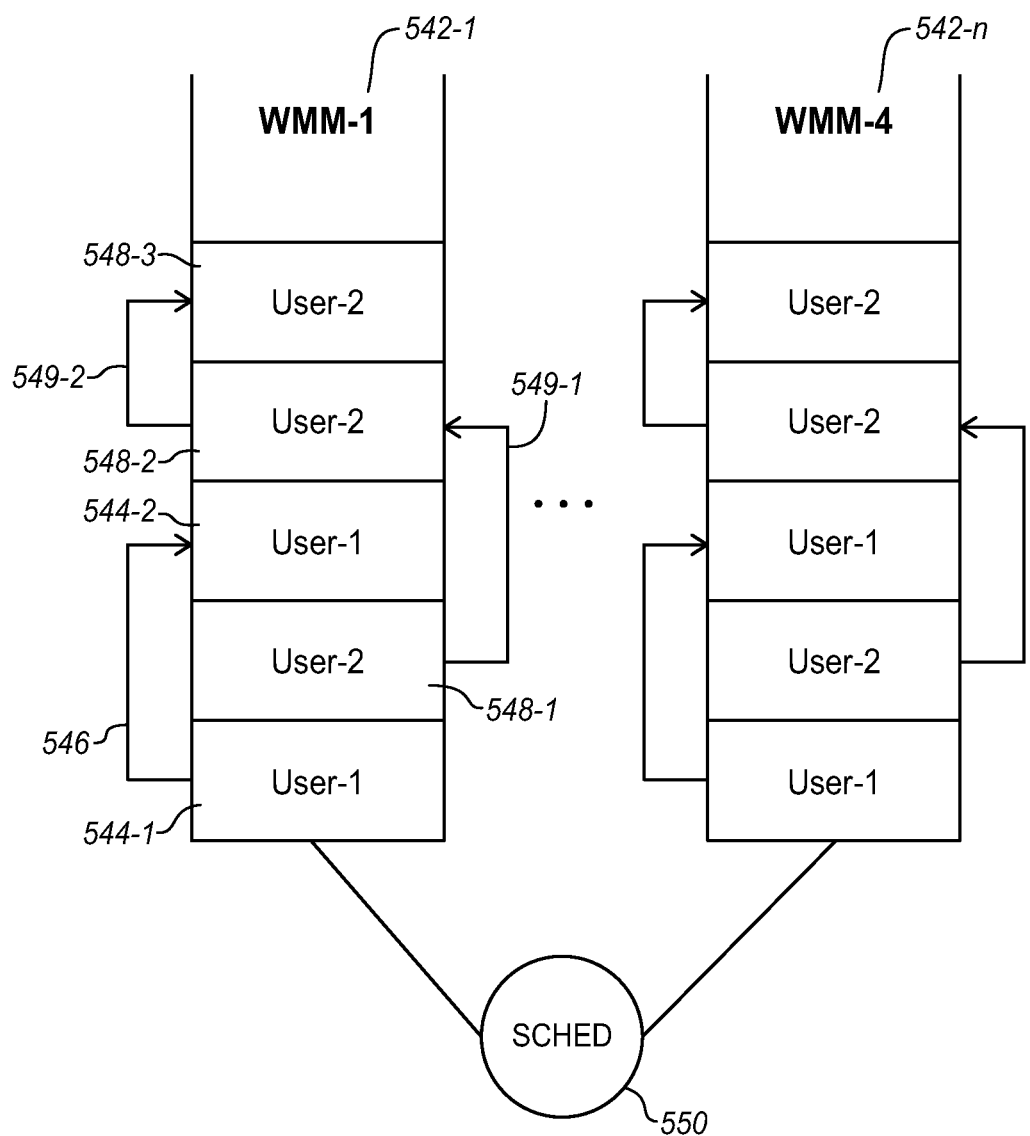
FIG. 5B is another exemplary embodiment of queues for aggregating traffic.

FIG. 5B is an alternative diagram of four queues 542-1 to 542-4 (only two are shown), one for each of the WMM Access Categories. Each queue contains packets for all of the users or clients but there is a different queue for each of the four access categories. As with the example of FIG. 5A, the oldest packet is at the top of the queue. The queue operates something like a FIFO (First In First Out) buffer.

Referring to the first WMM category, WMM-1, the queue 542-1 shows queued packets for client device or User 1 544-1, 544-2, and for User 2 548-1, 548-2, 548-3. The queued packets for each user are related to each other by pointers. Accordingly, the packets for User 1 544-1, 544-2 are connected by a pointer 546. The packets for User 2 548-1, 548-2, 548-3 are connected by pointers 549-1, 549-2. The pointers allow each user's packets to be processed together for aggregation and other purposes. In this way FIG. 5A and FIG. 5B show two different views of the same data structure.

As in FIG. 5A, a scheduler 550 scans each queue to determine whether the oldest packet is too old and takes appropriate action when necessary. The scheduler also checks each user's packets in a queue to determine whether there are enough packets for aggregation.

The data in the queue may be adapted to suit a variety of different applications. The actual received packets may be stored in the queue or a pointer to the packet stored in another location. In one example, the scheduler 520, 550 functions are performed by the anchor processor for each client. The anchor processor functions also as a counter to track numbers of packets. Since the anchor processor has configuration information for its own clients, this allows the scheduler to be distributed across many different clients. However, the anchor and counter functions may be performed by a different processing resource or the functions may be separated.

In one example, the queue of either FIG. 5A or 5B contains the following information about each packet in the queue: (i) packet identification, (ii) corresponding user identification, (iii) time stamp for when the packet arrived, and (iv) pointer to the actual packet. Additional information may also be placed in the queue, depending on the particular implementation.

The anchor CPU also maintains additional information about the queues and their contents. The anchor CPU will also maintain in the storage resources 190 or in its own storage for each queue: (i) owner CPU, the CPU to which a queue is anchored; (ii) maximum size of the associated A-MSDU, (iii) WME AC, the access category of the queue, and (iv) maximum count, the number of packets required before aggregation. The maximum count may be negotiated between the anchor CPU and the client or it may be received from system management component of the network.

As the scheduler, the anchor CPU also maintains statistics for each queue for each client that it owns. This information may also be stored in the storage resources 190 of the controller or in the CPUs own resources. The scheduler information will include: (i) the total number of bytes for each queue, (ii) the total number of packets for each queue, (iii) the total number of packets that have been aggregated, and (iv) the total number of aggregated frames that have been generated. The scheduler may also track an identification of the packet at the head of a queue for the user and an identification of the packet at the tail of the queue for the user. This information allows the scheduler to quickly assess timestamps and accumulated packet totals. It also allows the scheduler to aggregate all of the queued packets quickly.

FIG. 6 is process flow diagram of aggregating traffic using the queues and logic described above. At 612 packets are received at, for example, a controller. The packets may be received from a source or a client. In the described examples, the packets are received at a controller 30 from a source 20 and are aggregated before being sent using a tunnel through the cloud 33 to a wireless access point 40 to be received by a client 50.

The received packets are optionally analyzed, by for example a Network Acceleration Engine and forwarded to one of a plurality of packet processors. The packet processor may be selected form the plurality based on the station to which it is directed or based on some other criteria. At 614, the received packet is queued by the assigned packet processor. The packet is placed in a selected queue of a plurality of different queues. The queues are based at least on an identifier of the station to which the packet is directed and a category associated with the packet.

The associated category for the received packet may be determined based on a type of data carried by a payload of the packet. The category may be selected from WMM or similar categories such as a best effort category, a background category, a video category, and a voice category. The category may alternatively be selected based on a TID (Traffic Identifier) that identifies a traffic category to which a corresponding media access control service data unit belongs.

At 616 the queue is checked to determine whether the size of the queue, typically, but not necessarily determined by a number of bits, has reached a predetermined size. The size may be predetermined for the destination station indicated in the packet and corresponding to the station identifier. If the queue has not reached the size then the process continues to check for latency at 624. If the queue has reached the predetermined size, then at 618 the packets in the selected queue are aggregated to create an aggregated packet.

At 620 the aggregated packets are transmitted to the determined station and at 622, the process flow returns to receive more packets at 612. The queuing, the checking of the queue, and the aggregating may all be handled by the anchor processor that originally place the packet in the queue.

If the queue has not reached the predetermined size, then at 624, the anchor processor or another logic component may determine if the packet has reached the maximum latency. If none have, then the process returns to receive additional packets at 612. While the queue size and latency checks are indicated as being related in sequence and logic, they may also be performed as completely unrelated parallel operations. The queue may be checked periodically for size or after each new packet arrives. The latency may be checked based on a clock or after each new packet or based on any other trigger. As described above, using the multiple queues the latency of the oldest packet can be quickly checked by checking the oldest packet for each category of queue. In the described example the timestamps of only four packets is checked. These are the packets at the head of each of the four queues.

If the packet at the head of one of the queues has become too old, then that oldest packet may be transmitted at 626 with no further delay. Alternatively, multiple packets that have reached their maximum latency may be transmitted, either one at a time or aggregated together. In another alternative, all of the packets in the queue for that user and category can be aggregated and sent. While the aggregated packets will not be as many as if the predetermined aggregate size had been reached, the packets will be sent faster, the queue will be emptied and some efficiency advantages may be realized.

Operations may be removed, added, or modified from what is shown in FIG. 6 and the order of some of the operations may be changed. As with the other figures, the process flow of FIG. 6 is intended only as one of many examples.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as determined by the appended claims and their equivalents. For instance, different or additional tests may be performed between the two devices, different forms of key generation and exchange may be used, and different test words may be used, depending on the particular implementation. The description is thus to be regarded as illustrative instead of limiting.

What is claimed is:

1. A method comprising:
    receiving, by a network device having a plurality of processors, a packet destined to a station, wherein the network device maintains a plurality of queues each corresponding to a different traffic type category and each queue of the plurality of queues is subdivided into sub-queues that each correspond to different station identifiers;
    queuing, by one of the plurality of processors, the packet in (1) a selected queue of the plurality of queues based at least on a traffic category associated with the packet and (2) a selected sub-queue of the plurality of sub-queues within the selected queue based on an identifier of the station, wherein packets in the selected sub-queue are associated with a timestamp indicating each packet's respective time of arrival and wherein packets in the sub-queue are ordered by their respective timestamps;
    examining a timestamp associated with a first packet in the selected sub-queue to determine whether the timestamp of the first packet exceeds a predetermined latency threshold;
    upon detecting that the timestamp exceeds the predetermined latency threshold, aggregating packets in the selected sub-queue to create an aggregated packet; and
    transmitting the aggregated packet to the station.

2. The method of claim 1, wherein each of the plurality of processors corresponds to a subset of stations, and wherein packets destined to a respective station are assigned to a respective processor based at least in part on a hash value of a station identifier.

3. The method of claim 1, further comprising:
    upon detecting that the selected sub-queue has reached a predetermined size, aggregating packets in the selected sub-queue to create the aggregated packet.

4. The method of claim 1, wherein packets in each of the sub-queues are linked in the sub-queue.

5. The method of claim 3, further comprising determining by a second processor of the plurality of processors whether the selected sub-queue has reached the predetermined size, wherein the second processor is associated with a plurality of flows destined to the station.

6. The method of claim 5, wherein the second processor determines whether each sub-queue maintained by each of the plurality of processors associated with each station identifier and each category has reached the size predetermined for the station corresponding to the station identifier.

7. The method of claim 5, wherein aggregating packets is performed by one of the plurality of processors in response to the second processor determining that the selected sub-queue has reached the predetermined size and notifying the one of the plurality of processors to remove the packets from the selected sub-queue after aggregating the packets.

8. The method of claim 1, further comprising determining the category for the received packet based on a type of data carried by a payload of the packet.

9. The method of claim 1, wherein the category is selected from one of a best effort category, a background category, a video category, and a voice category.

10. The method of claim 1, wherein the packet comprises a traffic identifier that identifies a traffic category to which a corresponding media access control service data unit belongs.

11. An apparatus comprising:
    a plurality of hardware processors;
    a memory unit coupled to the plurality of hardware processors, the memory unit having instructions that when executed by one or more of the hardware processors cause the apparatus to:
        process a received packet destined to a station, wherein the apparatus maintains a plurality of queues that each correspond to a different traffic type category and each queue of the plurality of queues is subdivided into sub-queues each corresponding to different station identifiers;
        queue, by one of the plurality of hardware processors, the packet in (1) a selected queue of the plurality of queues based at least on a traffic category associated with the packet and (2) a selected sub-queue of the plurality of sub-queues within the selected queue based on an identifier of the station, wherein packets in the selected sub-queue are associated with a timestamp indicating each packet's respective time of arrival and wherein packets in the sub-queue are ordered by their respective timestamps;
        examine a timestamp associated with a first packet in the selected sub-queue to determine whether the timestamp of the first packet exceeds a predetermined latency threshold;
        upon detecting that the timestamp exceeds the predetermined latency threshold, aggregate packets in the selected sub-queue to create an aggregated packet; and
        transmit the aggregated packet to the station.

12. The apparatus of claim 11, further comprising:
    upon detecting that the selected sub-queue has reached a predetermined size, aggregate packets in the selected sub-queue to create the aggregated packet.

13. The apparatus of claim 11, the apparatus further configured to remove the aggregated packets from the queue.

14. A non-transitory computer-readable medium including instructions which, when executed by one or more hardware processors, perform operations comprising:
    subsequent to receiving a packet destined to a station, maintaining a plurality of queues that each correspond to a different traffic type category and each queue of the plurality of queues is subdivided into a plurality of sub-queues each corresponding to different station identifiers;
    queuing the packet in (1) a selected queue of the plurality of queues based at least on a traffic category associated with the packet and (2) a selected sub-queue of the plurality of sub-queues within the selected queue based on an identifier of the station, wherein packets in the selected sub-queue are associated with a timestamp indicating each packet's respective time of arrival and wherein packets in the sub-queue are ordered by their respective timestamps;

examining a timestamp associated with a first packet in the selected sub-queue to determine whether the timestamp of the first packet exceeds a predetermined latency threshold;

aggregating packets, wherein upon detecting that the timestamp exceeds the predetermined latency threshold, the means for aggregating packets aggregates packets in the selected sub-queue to create an aggregated packet; and transmitting the aggregated packet to the station.

15. The non-transitory computer-readable medium of claim 14, wherein the instructions which, when executed by one or more hardware processors, aggregating packets that comprises aggregating packets in the selected sub-queue to create the aggregated packet upon detecting that the selected sub-queue has reached a predetermined size.

* * * * *

UNITED STATES PATENT AND TRADEMARK OFFICE
CERTIFICATE OF CORRECTION

Page 1 of 1

PATENT NO. : 9,125,089 B2
APPLICATION NO. : 13/931612
DATED : September 1, 2015
INVENTOR(S) : Bhanu S. Gopalasetty et al.

It is certified that error appears in the above-identified patent and that said Letters Patent is hereby corrected as shown below:

In the Claims

In column 13, lines 11-12, in Claim 14, delete "packet; and" and insert -- packet; --, therefor.

Signed and Sealed this
Fifth Day of July, 2016

Michelle K. Lee
*Director of the United States Patent and Trademark Office*